May 20, 1924.                                                    1,494,865
G. D. PIERCE
WIRE CUTTER
Filed April 18, 1922
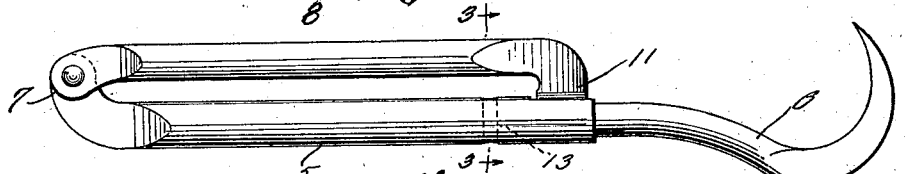
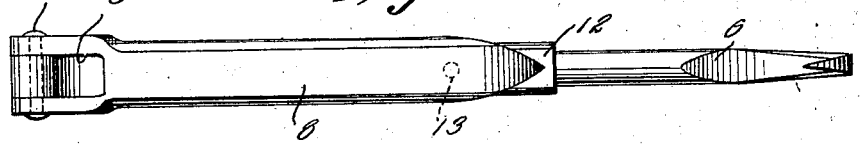
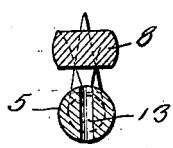
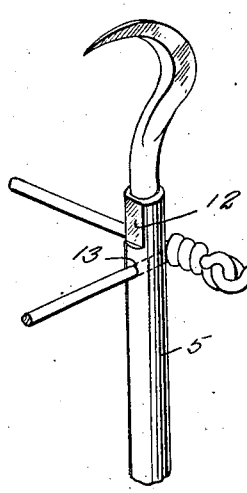
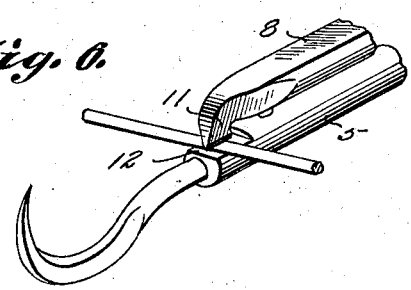
Inventor
George D. Pierce
By Norman T. Whitaker
his Attorney Patented May 20, 1924.

1,494,865

UNITED STATES PATENT OFFICE.

GEORGE D. PIERCE, OF CLARKSTON, WASHINGTON.

WIRE CUTTER.

Application filed April 18, 1922. Serial No. 554,636.

*To all whom it may concern:*

Be it known that I, GEORGE D. PIERCE, a citizen of the United States, and a resident of Clarkston, in the county of Asotin and State of Washington, have invented new and useful Improvements in Wire Cutters, of which the following is a specification.

My invention relates to combined wire-working tools and its principal object is to provide a tool which is capable of pulling staples, splicing and severing wire.

The invention further contemplates a tool for performing the above mentioned functions and which is simple in operation and construction.

Still another object of the invention is to provide a tool which includes a pair of pivoted members one of which is provided with wire working implements and which together coact to shear wire.

With the preceding and other objects and advantages in mind the invention consists in the novel combination of elements, construction and arrangement of parts and operations to be hereinafter more fully described, claimed and illustrated in the accompanying drawings wherein, Fig. 1 is a side elevation of the combined wire-working tool constructed in accordance with my invention.

Fig. 2 is a plan view of the same.

Fig. 3 is a transverse sectional view taken on line 3—3 of Fig. 1.

Fig. 4 is a fragmentary elevation of a device being used as a staple puller.

Fig. 5 is a perspective of a device performing the splicing operation; and

Fig. 6 is a perspective of the device in the act of cutting a length of wire.

Referring to the drawing in detail wherein like characters of reference designate like parts throughout the several views the numeral 5 discloses a shank having a staple pulling member 6 at one end, and its opposite end being extended laterally as designated at 7. Arranged in opposed relation in the shank 5 is a shank 8 having one end bifurcated as indicated at 9 and receiving the end 7 of the shank 5. A pivot pin 10 extends through the yoke 9 and the end 7 to pivotally connect these parts. The free end of this shank 8 terminates in an inwardly directed beveled cutting element 11 which is opposed to a flattened surface 12 upon the shank 5.

When the device is used as a wire-cutting tool the strand of wire is placed upon the flattened surface 12 of the shank 5 and the cutting element engaged with the wire as shown in Fig. 6. The shank 8 is then struck a blow by a hammer or other implement to cause the cutting element to sever the wire strand.

The shank 5 is provided with a transverse opening 13 through which one end of the wire to be spliced passes as shown in Fig. 5. When the parts are in the position shown in Fig. 5 the device is twisted axially about the length of wire to form the splice.

In removing staples the free end of the staple puller is engaged with the staple and when the staple puller resting against the object with which the staple is engaged the device is rocked downwardly. Staples removed from an object by my improved staple puller will not in any way be damaged and can readily be used the second time.

It is to be understood that the form of my invention herein shown and described is to be taken as a preferred example of the same, and that various changes in the shape, size and arrangement of parts may be resorted to without departing from the spirit of the invention or the scope of the subjoined claim.

I claim—

A wire cutter including a pair of opposed members pivotally connected at one end, one member having a flattened face adjacent one end thereof between the pivot and the free end of said member, and a cutting member carried by the free end of the other member adapted to engage an object resting on the flattened face.

GEORGE D. PIERCE.